United States Patent [19]

Pratt et al.

[11] 3,849,891

[45] Nov. 26, 1974

[54] GEAR TOOTH PROFILE TESTING MECHANISMS

[75] Inventors: Alan Pratt; Robert Andrew Ashfield, Huddersfield, England

[73] Assignee: David Brown Gear Industries Limited, Huddersfield, England

[22] Filed: Jan. 20, 1972

[21] Appl. No.: 219,476

[30] Foreign Application Priority Data
Jan. 27, 1971 Great Britain...................... 3340/71

[52] U.S. Cl............................................ 33/179.5 D
[51] Int. Cl............................ G01b 5/20, G01b 7/28
[58] Field of Search................................ 33/179.5 D

[56] References Cited
UNITED STATES PATENTS

| | | | |
|---|---|---|---|
| 1,884,368 | 10/1932 | Swain............................ | 33/179.5 D |
| 2,564,376 | 8/1951 | Schwartz et al. .............. | 33/179.5 D |
| 3,397,459 | 8/1968 | Ehrhardt et al................ | 33/179.5 D |
| 3,631,603 | 1/1972 | Munro............................. | 33/174 P |

*Primary Examiner*—Louis R. Prince
*Assistant Examiner*—Richard R. Stearns
*Attorney, Agent, or Firm*—Norris & Bateman

[57] ABSTRACT

Mechanism for testing the profile of an involute gear comprises a reference head for generating a pulsed electrical signal proportional to the angular displacement of the gear's base circle, a linear head having a stylus, said head and stylus being moveable in a linear path tangential to said circle with the stylus in contact with a tooth flank to be tested, said linear head generating a pulsed electrical signal proportional to its movement, and circuitry for deriving an output signal representative of said profile by comparing the two signals by causing them respectively to switch on and off, with a preferred initial phase relationship, a bistable device, the output of which controls a pen recorder. The heads are demountable from their separate operative positions to enable them to test a gear in situ on any gear producing machine, and to enable them to be assembled together for calibration with the aid of further circuitry which indicates when their pulse frequency ratio has been appropriately adjusted in case where the reference head will have to co-act with a reference cylinder co-axial with, but of known diameter different to that of, the gear's base circle.

5 Claims, 4 Drawing Figures

GEAR TOOTH PROFILE TESTING MECHANISMS

BACKGROUND OF INVENTION

The invention relates to a gear tooth profile testing mechanism and more particularly to a mechanism for testing the tooth flank profile of an involute gear.

SUMMARY OF INVENTION

According to the invention, a mechanism for testing the tooth flank profile of an involute gear comprises first means generating a signal proportional to the angular displacement of the gear's base circle, a member moveable in a linear path tangential to said circle in contact with a tooth flank of the rotating gear, second means generating a signal proportional to the linear displacement of said member, and apparatus for deriving an output signal by comparing the signals from the two means.

BRIEF DESCRIPTION OF DRAWINGS

A preferred embodiment of the invention will now be described, by way of example only, with reference to the accompanying drawings of which.

DESCRIPTION OF PREFERRED EMBODIMENTS

Figure 1:
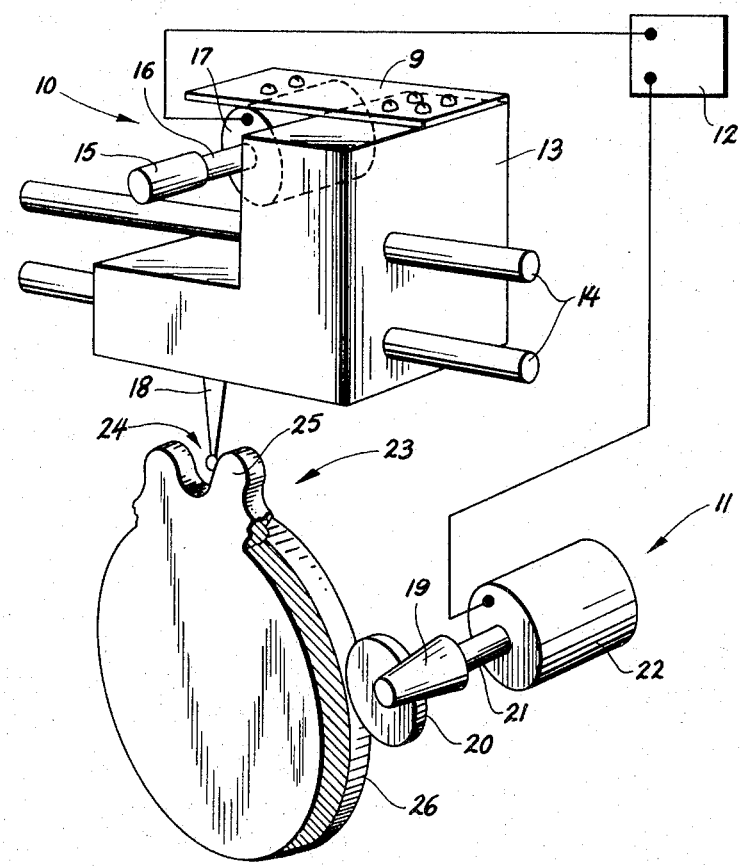
FIG. 1 is a diagrammatic perspective view of a gear tooth profile testing mechanism mounted in measuring position relative to a gear.

Referring now to the drawings, a gear tooth profile testing mechanism is formed of three separate units, namely a linear head unit indicated generally at 10, a reference head unit indicated generally at 11, and a control unit indicated generally at 12.

The linear head unit 10 comprises a carriage 13 which turns along a pair of parallel rails 14 on linear ball bushings (not shown). A cylindrical roller 15 is fixed on a shaft 16 of an optical digitiser 17 shown diagrammatically as being mounted on a leaf spring 9 secured to the carriage 13 in such a way that said roller is spring-loaded against one of the rails 14. The carriage 13 carries a stylus 18 which can be released from a retracted position to its operative position shown in FIG. 1 of the drawings by a remotely operated solenoid (not shown).

The reference head unit 11 comprises a frame (not shown) carrying a disc 20 and a tapered roller 19 which is spring-loaded against said disc. The tapered roller 19 is mounted on a shaft 21 of an optical digitiser 22 and the disc 20 is moveable along the taper of the roller 19.

Referring now to FIG. 1 of the drawings, the linear head unit 10 is mounted on a gear cutting machine (not shown) adjacent a gear 23 having an involute tooth flank profile to be measured and said linear head unit is aligned so that the rails 14 are parallel to a base tangent of the gear 23 and the tip of the stylus 18 travels along said base tangent. The stylus 18 is inserted into a tooth space 24 at a point offset from that radius of the gear 23 which is perpendicular to said base tangent. To measure a leading flank of a tooth 25, the carriage 13 is driven along the rails 14 by the tooth 25, as the gear 23 rotates in an anti-clockwise sense as viewed in FIG. 1, until the stylus 18 is moved clear of the tip of said tooth. To measure a trailing flank of a tooth, as the gear 23 rotates in an anti-clockwise sense as viewed in FIG. 1 the carriage 13 is driven along the rails 14, in order to maintain the stylus 18 in contact with said trailing flank, by an arrangement (not shown) including an electric motor and a slipping clutch. When the stylus 18 reaches a chosen depth on said flank, said motor is stopped automatically and the stylus is retracted from the tooth space 24. The reference head unit 11 is also mounted on the gear cutting machine in such a position that the disc 20 is held in driving engagement with the periphery of a reference cylinder 26 which forms part of the machine and rotates with the gear 23.

Figure 2:
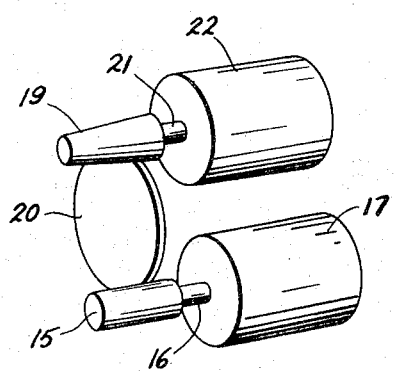
FIG. 2 is a diagrammatic perspective view of said mechanism in calibrating position.

Referring now to FIG. 2 of the drawings, in order initially to set the relative sensitivities of the linear head unit 10 and the reference head unit 11 to correct for the reference cylinder 26 having a diameter other than the base circle diameter of the gear 23, the digitiser 17 from the linear head unit 10 is mounted with its roller 15 spring-loaded against the disc 20 of the reference head unit 11 and the disc 20 is driven at a constant speed by a friction drive unit (not shown).

Each of the digitisers 17 and 22 generates 900 electrical pulses for one revolution of its associated shaft 16 or 21. The effective count of said pulses is reduced electrically by a factor of 8 and the roller 15 associated with the digitiser 17 has such a diameter that in the measuring position of the mechanism shown in FIG. 1 one electrical pulse is generated by said digitiser for each 0.015 inches of movement of the carriage 13 parallel to the base tangent of the gear 23. The tapered roller 19 associated with the digitiser 22 has a mean diameter equal to the diameter of the roller 15 and thus when the disc 20 is positioned on said mean diameter one electrical pulse is generated by said digitiser for each 0.015 inches of peripheral movement of the reference cylinder 26. If the diameter of the reference cylinder 26 is equal to the base circle diameter of the gear 23, the electrical pulses generated by the digitisers 17 and 22 will have the same frequency and if the involute shape of the tooth flank being measured is correct said pulses will have a constant phase relationship. Involute errors in the shape of said tooth flank will advance or retard the pulses from the digitiser 17 relative to those from the digitiser 22 and these phase variations are measured by the control unit 12 as hereinafter described.

If the diameter of the reference cylinder 26 is different from the base circle diameter of the gear 23 the equality of the frequencies of the pulses generated by the digitisers 17 and 22 is restored by adjusting the position of the disc 20 and the tapered roller 19 or, if the difference is large, either by inserting gears between the roller 19 and the digitiser 22 or by changing the diameter of the roller 19 so that during calibration the ratio of the frequency of the pulses generated by the digitiser 17 to the frequency of the pulses generated by the digitiser 22 equals the ratio of the diameter of the reference cylinder 26 to the diameter of the base circle of the gear 23.

Figure 3:
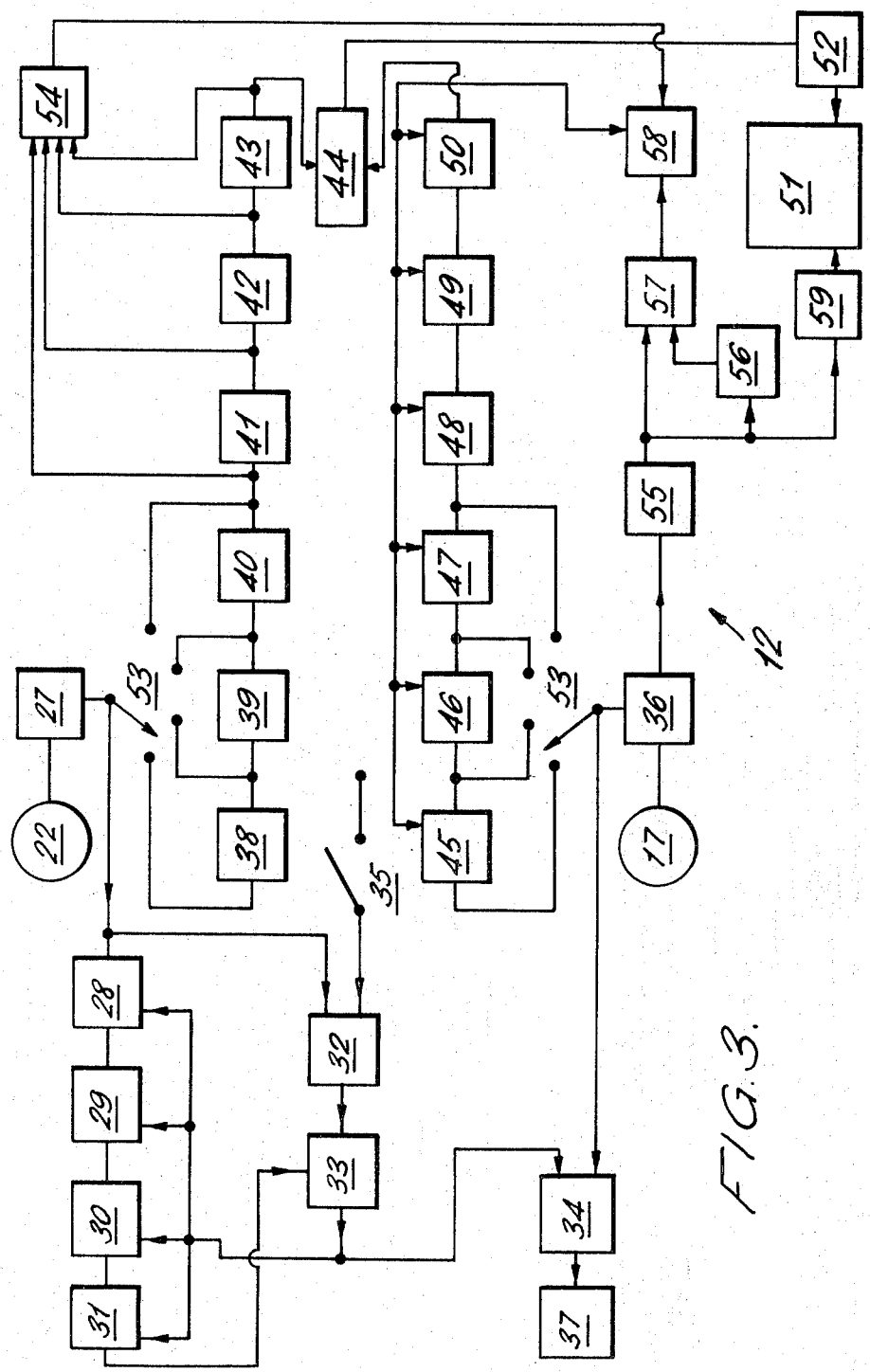
FIG. 3 is a block circuit diagram of said mechanism.

This adjustment is made by mounting the digitisers 17 and 22 in the calibrating position shown in FIG. 2 and described above and passing the pulse outputs generated by said digitisers to the control unit 12. Referring now to FIG. 3 of the drawings, the pulses from the digitiser 22 are fed via a pulse shaper 27 in the form of a Schmitt trigger to a chain of decade dividing circuits 28, 29, 30, 31 connected in cascade and to a gating switch 32 which is normally closed. When in its preferred state, a bistable device (flip-flop) 33 keeps the circuits 28–31 inoperative and a gate 34 closed. The closure of a manual switch 35 causes the gating switch 32 to open and allow the next pulse from the digitiser 22 to pass and change the state of the bistable device 33. This simultaneously makes the circuits 28–31 operative and opens the gate 34. The pulses from the digitiser 22 then pass into the chain of circuits 28–31 and the pulses from the digitiser 17 are fed via a pulse shaper 36 to a digital counter 37. After 10,000 pulses from the digitiser 22, the circuit 31 passes a pulse to the bistable device 33 and changes it back to its preferred state. This closes the gate 34 and makes the circuits 28–31 inoperative again. As the counter 37 receives pulses from the digitiser 17 for a period equal to 10,000 pulses from the digitiser 22, the count recorded by said counter represents the frequency ratio of the pulses from the digitisers 17 and 22 and hence the diameter ratio to four figures. The correct count is obtained by adjustment of the disc 20 along the tapered roller 19, or by making one of the other adjustments hereinbefore described.

After calibration has been completed the linear head unit 10 and the reference head unit 11 are mounted on the gear cutting machine as hereinbefore described. The output pulses from the digitiser 22 having a sinusoidal wave form are passed through the pulse shaper 27 which converts said pulses to a square wave before they are fed to a chain of divide-by-two circuits (or J–K flip-flops) 38, 39, 40, 41, 42, 43. The output signal from the circuit 43 is adapted to switch on a bistable device 44. The output pulses from the digitiser 17 are likewise passed through the pulse shaper 36 before they are fed to a chain of divide-by-two circuits (or J–K flip-flops) 45, 46, 47, 48, 49, 50. The output signal from the circuit 50 is adapted to switch off the device 44. As the pulses from the digitisers 22 and 17 have the same nominal frequency, the bistable device 44 is switched on and off continuously and the on/off ratio (or mark-space ratio) is dependent on the phasing of the pulses. The device 44 thus acts as a phase sensitive detector. The average voltage of the output signal from the device 44 is proportional to the on/off ratio and is displayed on a pen recorder 51 after passing through a low-pass filter 52. Each of two banks of a manual switch 53 feeds the pulses from one of the digitisers 22 and 17 to any one of four alternative positions along the associated chain of divide-by-two circuits 38–43 or 45–50. This enables the measuring sensitivity to be progressively changed by factors of 2.

Figure 4:
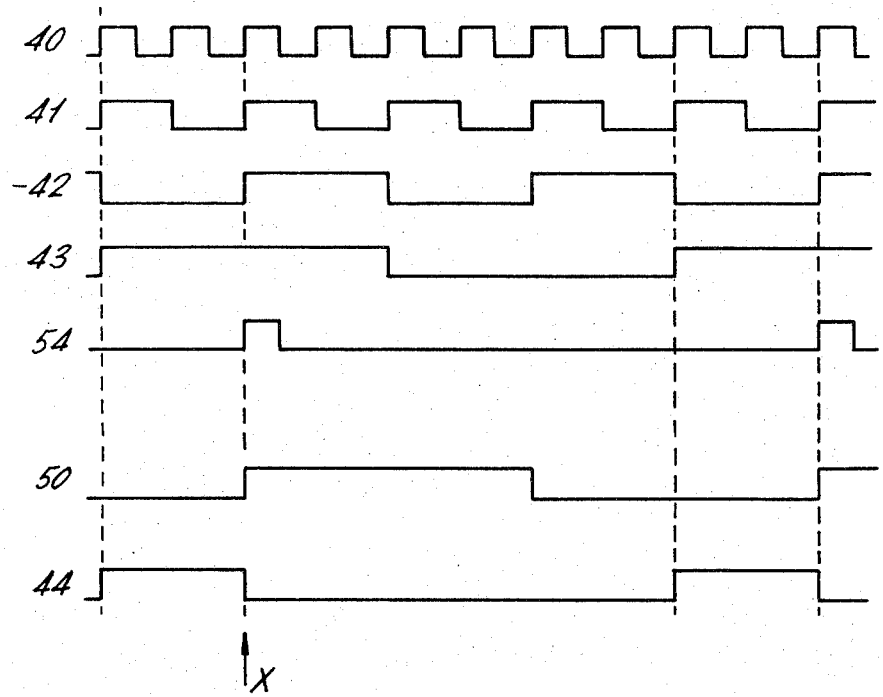
FIG. 4 is a diagram of output signals from selected circuit components.

When measurement begins, the signals from the circuits 43 and 50 have an arbitrary phase relationship. A preferred initial phase relationship is obtained as next described. FIG. 4 shows the output signals at several indicated circuit locations. The relative phase of the output signals from the circuits 43 and 50 as shown in FIG. 4 creates an on/off ratio of 25/75 at the bistable device 44. The pulses from the digitiser 22 are being generated continuously whereas those from the digitiser 17 are generated only during measurement. In order to achieve the initial phase relationship shown in FIG. 4 the first signal from the circuit 50 must commence at the time marked X. Positive signals from the circuits 40, 41, 43 and a negative signal from the circuit 42 are therefore fed from tappings in the chain of circuits 38–43 to a 4-input NAND gate 54, the output signal from said gate being one pulse at the time marked X for every eight pulses from the circuit 40. The positive or negative sign is achieved for the signals from the circuits 40–43 by choosing the appropriate complementary output from each of said circuits. By choosing different combinations of signs for the signals from the circuits 40–43, a pulse can be generated at any one of eight different positions relative to the output signal from the circuit 43. The pulses from the digitiser 17 are fed through the shaper 36 to a pulse detector 55 and thence to a delay circuit 56 and a gate 57. The circuit 56 controls the gate 57 which holds a bistable device (flip-flop) 58 in a preferred state, the output from the bistable device 58 in its turn holding the circuits 45–50 in a preferred state. The first pulse from the digitiser 17 switches on the pulse detector 55 and the delay circuit 56. After a delay of approximately one quarter of a second, during which time the motion of the carriage 13 becomes stabilised, the delay circuit 56 switches off and the gate 57 then changes its state and makes the bistable device 58 operative. The next pulse from the NAND gate 54 changes the state of the bistable device 58 which in its turn makes the circuits 45–50 operative. The next pulse from the digitiser 17 initiates the output signal from the circuit 50. The exact initial on/off ratio depends on the relative phasing of said next pulse from the NAND gate 54 and the initiating pulse from the digitiser 17, and small variations from the desired nominal on/off ratio are possible. The pulse detector 55 also controls a switching circuit 59 which energises a chart drive mechanism of the pen recorder 51 whilst measurements are taking place.

Measurement of the profile of a tooth flank is initiated by energising the solenoid (not shown) in the carriage 13 so that it takes up its operative position in the tooth space 24. If a trailing flank of a tooth is to be measured, the arrangement (not shown) including an electric motor and a slipping clutch is next made operative. The carriage 13 then commences to be moved along the rails 14 either by said arrangement or, if a leading flank of the tooth 25 is to be measured, by said tooth as the gear 23 rotates, the speed of the carriage at any instant being determined by the profile of that part of the tooth flank being measured which is momentarily in contact with the stylus 18. The preferred initial phase relationship between the signals from the circuits 43 and 50, that is to say the preferred on/off ratio of the bistable device 44, is obtained, and the chart drive mechanism of the pen recorder 51 is then energised, in the manner described in the preceding paragraph. The electrical pulses generated by the digitisers 17 and 22 are passed to the bistable device 44 and the phase difference between the trains of said pulses is measured as hereinbefore described. The minimum output signal from the bistable device 44 to the recorder 51 occurs when the two pulse trains are in phase and the maximum signal occurs when the pulse trains have changed phase by almost one pulse pitch. With the roller diameters and digitisers described above, this range is due to an error of 0.015 inches and is the basic system sensitivity. Said sensitivity can be changed by factors of 2 by means of the switch 53 associated with both chains of divide-by-two circuits 38–43 and 45–50. After measurement is complete the pulses from the digitiser 17 cease, whereupon the pulse detector 55 switches off and de-energises the chart drive mechanism of the pen recorder 51.

It will be realised that the division of the mechanism into three separate units, namely the linear head unit 10, the reference head unit 11, and the control unit 12, makes the mechanism easily transportable from one gear cutting machine to another.

In a modification, a meter is employed in place of, or in addition to, the pen recorder 51. In another modification, a switch is associated with the chain of decade dividing circuits 28–31 in such a manner that said circuits give one output pulse for either 100, 1000 or 10,000 input pulses depending upon the monitoring position of said switch, so that the frequency ratio of the pulses from the digitisers 17 and 22 and thus the diameter ratio is given to either two, three or four figures.

What we claim is:

1. A mechanism for checking the tooth flank profile of an involute gear in situ on a rotatable member in a gear-producing machine comprising first means for generating an electrical signal in the form of pulses proportional in number to the angular displacement of a first input shaft, a first transmission means for transferring motion from a cylindrical surface on said rotating member to said input shaft of said first generating means, a member having a gear contacting portion carried on means constraining said portion of said member to movement along a linear path parallel to a line tangential to the gear's base circle and in contact with a tooth flank of the gear, second means for generating an electrical signal in the form of pulses proportional in number to the rotation of a second input shaft, a second transmission means fixably mounted with respect to said member and engaging a surface on said machine parallel to said path for producing a rotational displacement of said second shaft proportional to the linear displacement of said member, and means for comparing the phase of the signals produced by said first and second generating means including circuit means for establishing an initial phase relationship between said signals, the transmission means associated with one of said two generating means being adjustable to make allowance for the ratio of the circumference of said gear's base circle and said adjustable transmission means comprising an elongated tapered roller in frictional engagement with a motion transferring element the relative position of which along said tapered roller is adjustable.

2. A mechanism according to claim 1, wherein said first and second generating means are each connected to a chain consisting of a variable number of divide-by-two circuits to vary the sensitivity of the measurements recorded by the mechanism, said circuit means comprising an arrangement whereby the signal from the second generating means is fed to a delay circuit controlling a bi-stable device which in turn controls the chain of divide-by-two circuits connected to said second generating means, and selected tappings in the chain of divide-by-two circuits connected to the first generating means are fed to a plurality of inputs of a NAND gate, said gate also controlling said bi-stable device to enable an initial phase relationship between the outputs of the final circuits in the respective chains to be obtained, said relationship being determined by the selection of said tappings.

3. A mechanism as defined in claim 1, wherein said member is carried on track means and said second transmission means engages said track means.

4. A mechanism according to claim 1, including means for temporarily mounting said first and second generating means and their associated transmission means in direct driving engagement with one another prior to the commencement of checking, a motor for directly driving one of said generating means and thus indirectly driving the other when so mounted, and means for indicating when the adjustable transmission means has been correctly adjusted by comparing the signals from the first and second generating means.

5. A mechanism according to claim 4, wherein the means for indicating when the adjustable transmission means has been correctly adjusted by comparing the signals from the first and second generating means comprises a digital counter to which the signal from one of said generating means passes and a chain of decade dividing circuits through which the signal from the other of said generating means passes, the output of said chain determining the period during which the signal from said one of said generating means is registered by the counter.

* * * * *